United States Patent
Zuo et al.

(10) Patent No.: US 9,304,910 B2
(45) Date of Patent: Apr. 5, 2016

(54) SLICE FORMATTING AND INTERLEAVING FOR INTERLEAVED SECTORS

(71) Applicant: LSI Corporation, San Jose, CA (US)

(72) Inventors: Qi Zuo, Milpitas, CA (US); Kuhong Jeong, San Jose, CA (US); Shu Li, San Jose, CA (US); Xiang Wang, Shanghai (CN); Han Fang, Shanghai (CN); Shaohua Yang, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 200 days.

(21) Appl. No.: 14/153,154

(22) Filed: Jan. 13, 2014

(65) Prior Publication Data

US 2015/0161045 A1    Jun. 11, 2015

Related U.S. Application Data

(60) Provisional application No. 61/914,210, filed on Dec. 10, 2013.

(51) Int. Cl.
*G06F 12/06* (2006.01)

(52) U.S. Cl.
CPC ............................... *G06F 12/0607* (2013.01)

(58) Field of Classification Search
None
See application file for complete search history.

(56) References Cited

U.S. PATENT DOCUMENTS

| | | | | |
|---|---|---|---|---|
| 9,104,330 B1 * | 8/2015 | Haase | .................. | G06F 3/0644 |
| 2010/0274960 A1 * | 10/2010 | Lee | ..................... | G06F 12/0607 |
| | | | | 711/106 |
| 2010/0293348 A1 * | 11/2010 | Ye | ......................... | G06F 3/0613 |
| | | | | 711/157 |

* cited by examiner

*Primary Examiner* — Gary Portka

(57) ABSTRACT

A storage system and method for interleaving a plurality of logical sectors in the storage system is disclosed. The method includes: dividing each logical sector into a predetermined number of slices; sequentially indexing the logical sectors, wherein each logical sector is identified by a logical sector index; sequentially indexing the predetermined number of slices in each logical sector, wherein each slice of the predetermined number of slices is identified by a slice index within each logical sector; and interleaving the logical sectors according to a slice interleaving process. The interleaving step further includes: a) identifying a first indexed slice of a first indexed logical sector as an initial slice; and b) identifying a subsequent slice by advancing the slice index to a subsequent index in the slice index sequence and advancing the logical sector index to a subsequent index in the logical sector index sequence.

20 Claims, 4 Drawing Sheets

SLICE FORMATTING AND INTERLEAVING FOR INTERLEAVED SECTORS

CROSS-REFERENCE TO RELATED APPLICATIONS

The present application claims the benefit under 35 U.S.C. §119(e) of U.S. Provisional Application Ser. No. 61/914,210, filed Dec. 10, 2013. Said U.S. Provisional Application Ser. No. 61/914,210 is hereby incorporated by reference in its entirety.

TECHNICAL FIELD

The present invention relates to the field of data storage and particularly to data storage interleaving.

BACKGROUND

In data storage, interleaving is a technique used to improve access performance to storage by putting data accessed sequentially into non-sequential sectors. Interleaving techniques are used in ordering block storage on disk-based storage devices such as hard disks.

SUMMARY

Accordingly, an embodiment of the present disclosure is directed to a method for interleaving a plurality of logical sectors in a storage system. The method includes: dividing each logical sector of the plurality of logical sectors into a predetermined number of slices; sequentially indexing the plurality of logical sectors, wherein each logical sector of the plurality of logical sectors is identified by a logical sector index; sequentially indexing the predetermined number of slices in each logical sector, wherein each slice of the predetermined number of slices is identified by a slice index within each logical sector; and interleaving the plurality of logical sectors according to a slice interleaving process. The interleaving step further includes: a) identifying a first indexed slice of a first indexed logical sector as an initial slice; and b) identifying a subsequent slice by advancing the slice index to a subsequent index in the slice index sequence and advancing the logical sector index to a subsequent index in the logical sector index sequence.

A further embodiment of the present disclosure is directed to a method for interleaving a plurality of logical sectors in a storage system. The method includes: dividing each logical sector of the plurality of logical sectors into a predetermined number of slices; sequentially indexing the plurality of logical sectors, wherein each logical sector of the plurality of logical sectors is identified by a logical sector index; sequentially indexing the predetermined number of slices in each logical sector, wherein each slice of the predetermined number of slices is identified by a slice index within each logical sector; and interleaving the plurality of logical sectors according to a slice interleaving process. The interleaving step further includes: a) identifying a first indexed slice of a first indexed logical sector as an initial slice; b) identifying a subsequent slice by advancing the slice index to a subsequent index in the slice index sequence and advancing the logical sector index to a subsequent index in the logical sector index sequence; c) determining whether the subsequent slice identified in b) is a duplicated slice; and d) identifying the subsequent slice by further advancing the logical sector index to a subsequent index in the logical sector index sequence when the subsequent slice identified in b) is a duplicated slice.

An additional embodiment of the present disclosure is directed to a storage system. The storage system includes at least one storage device, wherein the at least one storage device implements an interleaved sector storage technique for storing a plurality of logical sectors. The storage system also includes a processing module for processing interleaving of the plurality of logical sectors. The processing module is configured to: divide each logical sector of the plurality of logical sectors into a predetermined number of slices; sequentially index the plurality of logical sectors, wherein each logical sector of the plurality of logical sectors is identified by a logical sector index; sequentially index the predetermined number of slices in each logical sector, wherein each slice of the predetermined number of slices is identified by a slice index within each logical sector; and interleave the plurality of logical sectors according to a set of slice interleaving rules, wherein the slice interleaving rules includes: a) identify a first indexed slice of a first indexed logical sector as an initial slice; and b) identify a subsequent slice by advancing the slice index to a subsequent index in the slice index sequence and advancing the logical sector index to a subsequent index in the logical sector index sequence.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
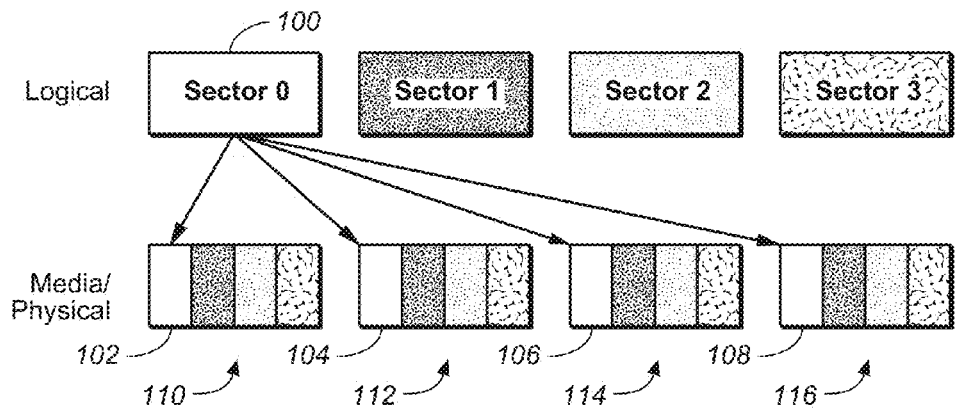
FIG. 1 is an illustration depicting a logical sector interleaved into multiple media/physical sectors.

Logical sectors are utilized in storage systems to provide an abstraction (separation) of logical storage from physical storage. Utilizing logical sectors generally simplifies addressing schemes used by input/output devices interacting with the storage system. Interleaved sector is a disk formatting technique developed to achieve signal-to-noise ratio averaging across a larger portion of media in hard disk drives. As shown in FIG. 1, a logical sector 100 is divided into a number of slices (102, 104, 106 and 108) and then interleaved into different media/physical sectors 110, 112, 114 and 116.

Figure 2:
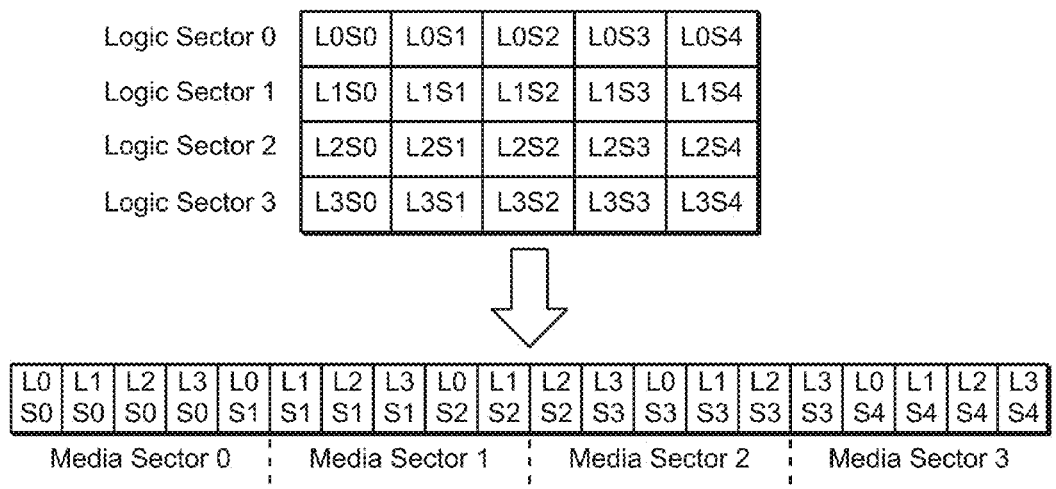
FIG. 2 is an illustration depicting a mapping between logical sectors and media sectors in a direct implementation.

FIG. 2 shows a direct implementation of interleaved sectors. In this example, four logical sectors are interleaved into four media sectors. The number of sectors being interleaved is referred to as the composite size of the interleaved sectors and denoted as N in the present disclosure (N=4 in this example). In addition, each sector (whether logical or physical) is divided into five slices as shown in FIG. 2. This number is denoted as M in the present disclosure (M=5 in this example). It is understood that the values of N and M are not limited to 4 and 5, respectively; the values of N and M can be any integer greater than 1 without departing from the spirit and scope of the present disclosure.

It is also noted that the notation $L(x)S(y)$, $x \in [0, N-1]$, $y \in [0, M-1]$ is utilized to denote slice y of sector x, wherein y is the slice index and x is the logical sector index. For example, in the direct implementation of interleaved sectors shown in FIG. 2, the interleaved media sector contains the first slice of the first sector (L0S0), followed by the first slice of the second sector (L1S0), followed by the first slice of the third sector (L2S0), followed by the first slice of the fourth sector (L3S0), followed by the second slice of the first sector (L0S1) and so on.

Ideally, the interleaved sectors need to satisfy a few conditions. For instance, condition 1 requires the slices from the same logical sector to be evenly interleaved into the media sectors. In addition, each media sector should have the same size compared to the logical sector, which is referred to as condition 2 in the present disclosure. Furthermore, calculation of the slice size must be simple (condition 3), because read channel decode logic will reassemble logical sector from slices, and it would be very difficult for the read channel to handle if slice sizes are irregular from one logical sector to another.

To satisfy condition 1, a sector needs to be sliced as evenly as possible. However, this is not guaranteed since a sector may not be divided evenly into M slices. In such cases, one solution is to have one shorter slice per sector while the other M−1 slices in that sector have the uniform size. Now, to satisfy condition 3, one solution is to have the shorter slice at a fixed location (e.g., always make the last slice in each sector the shorter one). However, this solution does not address condition 2 presented above. More specifically, referring again to the example shown in FIG. 2, suppose the shorter slices are L0S4, L1S4, L2S4, and L3S4 (i.e., the last slice in each logical sector), the resulting interleaved media sector 3 containing L3S3, L0S4, L1S4, L2S4 and L3S4 is made shorter than the other three media sectors, and therefore fails to address condition 2 as described above.

Figure 3:
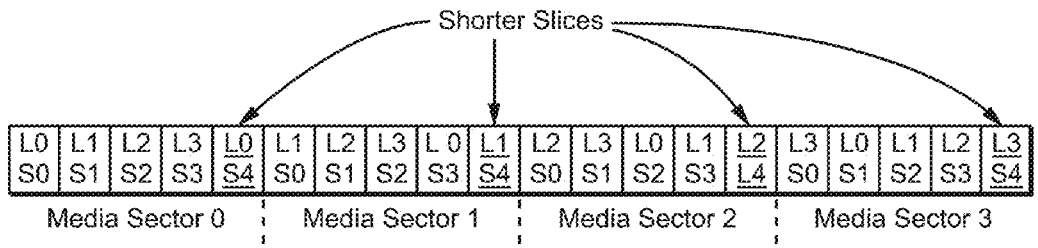
FIG. 3 is an illustration depicting a mapping between logical sectors and media sectors in an implementation that increases slice index along with the logical sector index.

Referring now to FIG. 3, a slice formatting and interleaving solution that satisfies all three conditions is illustrated. Similar to the slicing technique described above, each logical sector is sliced as evenly as possible and all logical sectors are sliced in the same manner. If the sector size is not divisible by M, let the last slice in each sector be the shorter one while all the other slices in that sector have the same size.

Now, to interleave these slices into the media sectors, the interleaving solution illustrated in FIG. 3 increases slice index along with the logical sector index by 1 for every media slice. In this manner, the shorter slices from the logical sectors are evenly distributed among the media sectors as shown in FIG. 3. This interleaving solution addresses conditions 2 and 3 described above.

Figure 4:
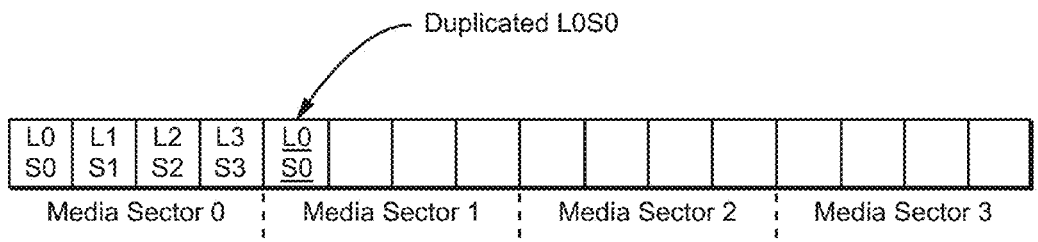
FIG. 4 is an illustration depicting a duplicated slice issue.

It is noted, however, that this solution has a slice duplication issue with certain values of M and N combinations. For example, if M is a multiple of N, the same slice will be reached more than once. This is illustrated in FIG. 4, where M=N=4, and a duplicated slice L0S0 appears when both the slice index and the logical sector index are increased by 1 after L3S3.

Figure 5:
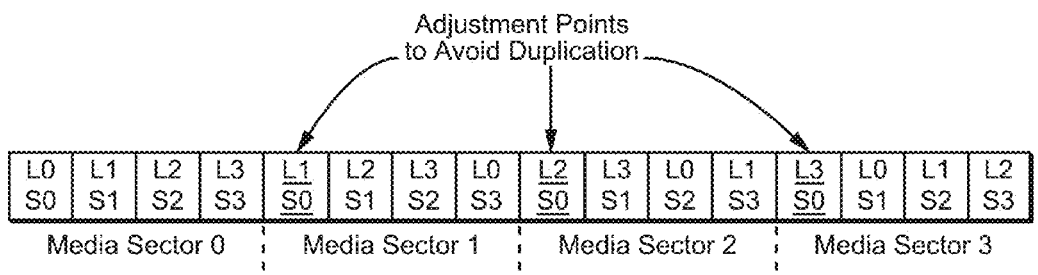
FIG. 5 is an illustration depicting a mapping between logical sectors and media sectors in an implementation that addresses the duplicated slice issue.

To solve this duplication issue, a special rule is invoked to increase the logical sector index by 1 more when duplication happens. This special rule is illustrated in FIG. 5, where M=N=4 as that shown in FIG. 4, however, the duplicated slice L0S0 is avoided because the logical sector index is then increased by 1 more and slice L1S0 now takes the slot where the duplicated slice L0S0 appears in FIG. 4. As an additional example, a duplicated slice L1S0 would appear after slice L0S3 in FIG. 5 without the special rule, however, the special rule increases the logical sector index by 1 and slice L2S0 now takes the slot after slice L0S3 in FIG. 5. The rule is applied in the same manner to avoid a duplicated slice L2S0 and replaced it with slice L3S0. It is noted that applying this special rule whenever duplication happens effectively resolves the duplication issue described above.

It is also noted that the process of increasing an index by 1 essentially is a process of advancing the index to a subsequent one in the sequence. For instance, advancing slice index S0 by 1 provides slice index S1, advancing slice index S1 by 1 provides slice index S2 and so on. In addition, advancing slice index S(M−1) by 1 provides slice index S0 because the index loops around. It is also noted, however, that the slice indices and the logical sector indices are not required to be integers starting from 0 and increment continuously up to M and N, respectively. It is contemplated that such indices can be implemented utilizing various formats without departing from the spirit and scope of the present disclosure, as long as such indices allow the slices and the logical sectors to be uniquely identified in a sequential order.

Figure 6:
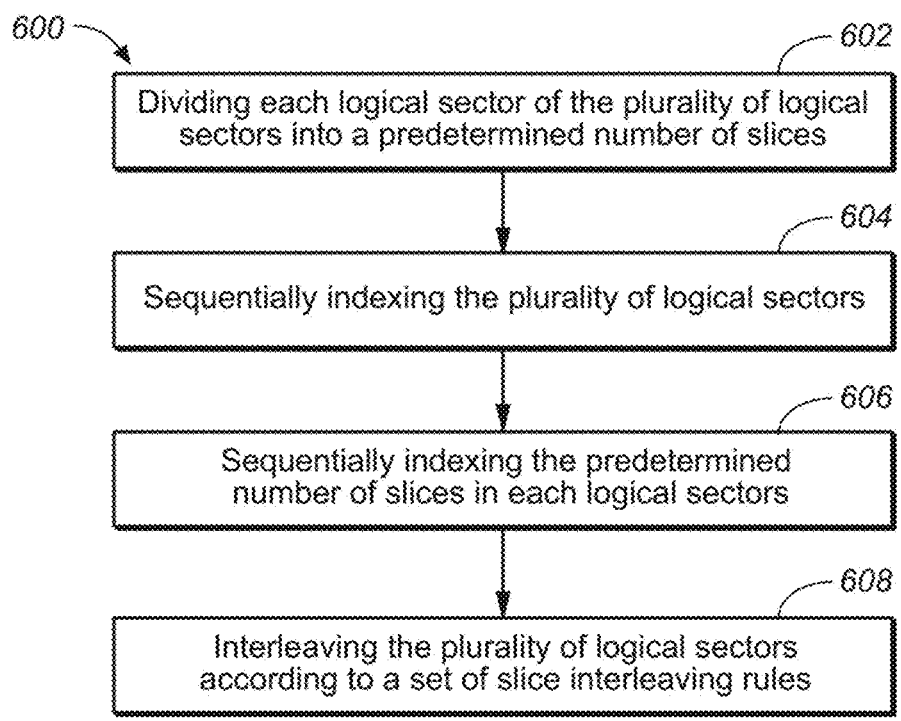
FIG. 6 is a flow diagram illustrating a method for interleaving a plurality of logical sectors in a storage system.

Referring to FIG. 6, a flow diagram illustrating a method 600 for interleaving a plurality of logical sectors in a storage system is shown. In accordance with one embodiment of the present disclosure, each logical sector of the plurality of logical sectors is divided into a predetermined number of slices in step 602. As previously described, if the logical sector size is not divisible by the predetermine number, the last slice in each logical sector is made shorter compared to other slices in that same logical sector, which are required to have the same uniform size. In addition, the logical sectors are sequentially indexed in step 604 and the slices within each logical sector are sequentially indexed in step 606. This indexing scheme allows the storage system to be able to identify each particular slice in a particular logical sector utilizing its logical sector index and slice index.

The slices in these logical sectors are then interleaved in step 608 according to a set of slice interleaving rules previously described. Specifically, the first indexed slice of the first indexed logical sector is identified as the initial slice of the interleaved data sequence. A subsequent slice can be identified by advancing both the slice index and the logical sector index. If the slice identified in this manner has not been included in the interleaved data sequence before, this slice is appended to the interleaved data sequence. On the other hand, if the slice identified in this manner has been included in the interleaved data sequence already, the logical sector index should be advanced again while keeping the slice index unchanged in order to identify the subsequent slice to be appended to the interleaved data sequence. This process continues until all slices in these logical sectors have been included in the interleaved data sequence.

Figure 7:
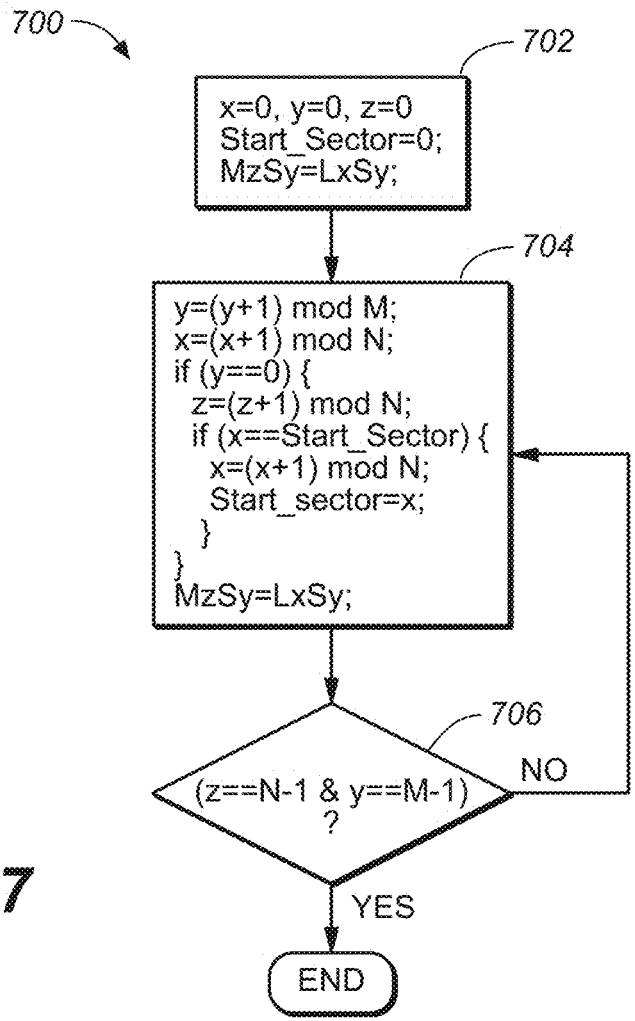
FIG. 7 is a flow diagram illustrating a pseudo code for slice formatting and interleaving.

Referring now to FIG. 7, a flow diagram illustrating the pseudo code for slice formatting and interleaving is shown. As previously defined, the notation $L(x)S(y)$, $x \in [0, N-1]$, y∈[0, M−1] is utilized to denote slice y of logical sector x. Similarly, the notation M(x)S(y), x∈[0, N−1], y∈[0, M−1] is utilized to denote slice y of media sector x. This pseudo code describes a specific implementation in accordance with the slice formatting and interleaving method described above, wherein both slice index and logical sector index are increased by 1 for every media slice, and wherein duplicated logical slices are avoided by further increasing the logical sector index by 1 when duplication occurs.

Figure 8:
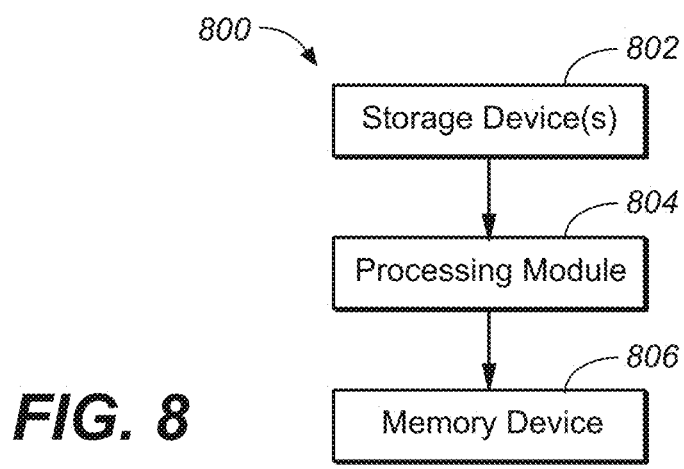
FIG. 8 is a block diagram depicting a storage system implementing slice formatting and interleaving.

Referring to FIG. 8, a block diagram illustrating a storage system 800 implementing slice formatting and interleaving is shown. The storage system 800 includes one or more storage devices 802 (e.g., hard disks or the like) communicatively coupled with a processing module 804. The processing module 804 can be implemented as either a stand-alone or an integrated component of the storage system 800 and utilized to controller certain functions of the storage devices 802. The processing module 804 includes a computer processor in communication with a memory device 806. The memory device 806 includes a computer-readable device having computer-executable instructions for performing the method 600 for slice formatting and interleaving as described above.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for interleaving a plurality of logical sectors in a storage system, the method comprising:
   dividing each logical sector of the plurality of logical sectors into a predetermined number of slices;
   sequentially indexing the plurality of logical sectors, wherein each logical sector of the plurality of logical sectors is identified by a logical sector index;
   sequentially indexing the predetermined number of slices in each logical sector, wherein each slice of the predetermined number of slices is identified by a slice index within each logical sector; and
   interleaving the plurality of logical sectors according to a slice interleaving process, including the steps of:
   a) identifying a particular slice of a particular logical sector as an initial slice;
   b) identifying a subsequent slice by advancing the slice index of the particular slice to a subsequent index in the slice index sequence and advancing the logical sector index of the particular slice to a subsequent index in the logical sector index sequence;
   c) determining whether the subsequent slice identified in b) is a duplicated slice; and
   d) identifying the subsequent slice by further advancing the logical sector index to a subsequent index in the logical sector index sequence when the subsequent slice identified in b) is a duplicated slice.

2. The method of claim 1, wherein the particular slice of the particular logical sector is a first indexed slice of a first indexed logical sector.

3. The method of claim 1, wherein each logical sector of the plurality of logical sectors is equally divided into the predetermined number of slices.

4. The method of claim 1, wherein each logical sector of the plurality of logical sectors is divided into a plurality of slices of a uniform data size and a remainder slice having a data size smaller than the uniform data size.

5. The method of claim 4, wherein the remainder slice in each logical sector of the plurality of logical sectors is identified by a slice index that is the last in the slice index sequence.

6. The method of claim 1, further comprising:
   storing the plurality of logical sectors in the storage system interleaved according to the set of slice interleaving rules.

7. The method of claim 6, wherein the plurality of logical sectors is interleaved and stored into a plurality of physical sectors, the number of physical sectors is the same as the number of logical sectors, and each physical sector includes the predetermined number of slices.

8. A method for interleaving a plurality of logical sectors in a storage system, the method comprising:
   dividing each logical sector of the plurality of logical sectors into a predetermined number of slices;
   sequentially indexing the plurality of logical sectors, wherein each logical sector of the plurality of logical sectors is identified by a logical sector index;
   sequentially indexing the predetermined number of slices in each logical sector, wherein each slice of the predetermined number of slices is identified by a slice index within each logical sector; and
   interleaving the plurality of logical sectors according to a slice interleaving process, including the steps of:
   a) identifying a first indexed slice of a first indexed logical sector as an initial slice;
   b) identifying a subsequent slice by advancing the slice index to a subsequent index in the slice index sequence and advancing the logical sector index to a subsequent index in the logical sector index sequence;
   c) determining whether the subsequent slice identified in b) is a duplicated slice; and
   d) identifying the subsequent slice by further advancing the logical sector index to a subsequent index in the logical sector index sequence when the subsequent slice identified in b) is a duplicated slice.

9. The method of claim 8, wherein each logical sector of the plurality of logical sectors is equally divided into the predetermined number of slices.

10. The method of claim 8, wherein each logical sector of the plurality of logical sectors is divided into a plurality of slices of a uniform data size and a remainder slice having a data size smaller than the uniform data size.

11. The method of claim 10, wherein the remainder slice in each logical sector of the plurality of logical sectors is identified by a slice index that is the last in the slice index sequence.

12. The method of claim 8, further comprising:
storing the plurality of logical sectors in the storage system interleaved according to the set of slice interleaving rules.

13. The method of claim 12, wherein the plurality of logical sectors is interleaved and stored into a plurality of physical sectors, the number of physical sectors is the same as the number of logical sectors, and each physical sector includes the predetermined number of slices.

14. A storage system, comprising:
at least one storage device, the at least one storage device implementing an interleaved sector storage technique for storing a plurality of logical sectors; and
a processing module for processing interleaving of the plurality of logical sectors, the processing module being configured to:
divide each logical sector of the plurality of logical sectors into a predetermined number of slices;
sequentially index the plurality of logical sectors, wherein each logical sector of the plurality of logical sectors is identified by a logical sector index;
sequentially index the predetermined number of slices in each logical sector, wherein each slice of the predetermined number of slices is identified by a slice index within each logical sector; and
interleave the plurality of logical sectors according to a set of slice interleaving rules, wherein the slice interleaving rules includes:
a) identify a particular slice of a particular logical sector as an initial slice; and
b) identify a subsequent slice by advancing the slice index of the particular slice to a subsequent index in the slice index sequence and advancing the logical sector index of the particular slice to a subsequent index in the logical sector index sequence;
c) determine whether the subsequent slice identified in b) is a duplicated slice; and
d) identify the subsequent slice by further advancing the logical sector index to a subsequent index in the logical sector index sequence when the subsequent slice identified in b) is a duplicated slice.

15. The storage system of claim 14, wherein the particular slice of the particular logical sector is a first indexed slice of a first indexed logical sector.

16. The storage system of claim 14, wherein each logical sector of the plurality of logical sectors is equally divided into the predetermined number of slices.

17. The storage system of claim 14, wherein each logical sector of the plurality of logical sectors is divided into a plurality of slices of a uniform data size and a remainder slice having a data size smaller than the uniform data size.

18. The storage system of claim 17, wherein the remainder slice in each logical sector of the plurality of logical sectors is identified by a slice index that is the last in the slice index sequence.

19. The storage system of claim 14, wherein the at least one storage device is configured to store the plurality of logical sectors interleaved according to the set of slice interleaving rules.

20. The storage system of claim 19, wherein the plurality of logical sectors is interleaved and stored into a plurality of physical sectors of the at least one storage device, wherein the number of physical sectors is the same as the number of logical sectors, and each physical sector includes the predetermined number of slices.

* * * * *